United States Patent
Finsy et al.

(10) Patent No.: US 12,218,304 B2
(45) Date of Patent: Feb. 4, 2025

(54) SOLID COMPOSITE ELECTROLYTE

(71) Applicant: SYENSQO SA, Brussels (BE)

(72) Inventors: Vincent Finsy, Halle (BE); Luca Merlo, Ixelles (BE); Marc-David Braida, Bry-sur-Marne (FR); Laure Bertry, Aubervilliers (FR)

(73) Assignee: SYENSQO SA, Brussels (BE)

( * ) Notice: Subject to any disclaimer, the term of this patent is extended or adjusted under 35 U.S.C. 154(b) by 781 days.

(21) Appl. No.: 17/312,023

(22) PCT Filed: Dec. 11, 2019

(86) PCT No.: PCT/EP2019/084682
§ 371 (c)(1),
(2) Date: Jun. 9, 2021

(87) PCT Pub. No.: WO2020/126751
PCT Pub. Date: Jun. 25, 2020

(65) Prior Publication Data
US 2022/0029193 A1    Jan. 27, 2022

(30) Foreign Application Priority Data
Dec. 21, 2018 (EP) .................................. 18215742

(51) Int. Cl.
*H01M 10/0562* (2010.01)
*H01M 10/0525* (2010.01)
*H01M 10/0563* (2010.01)

(52) U.S. Cl.
CPC ... *H01M 10/0562* (2013.01); *H01M 10/0525* (2013.01); *H01M 10/0563* (2013.01); *H01M 2300/0068* (2013.01)

(58) Field of Classification Search
None
See application file for complete search history.

(56) References Cited

U.S. PATENT DOCUMENTS

2012/0183868 A1  7/2012 Toussaint et al.
2014/0349197 A1  11/2014 Schilm et al.
(Continued)

FOREIGN PATENT DOCUMENTS

CN    108598516 A    9/2018
EP    3364489 A1     8/2018
(Continued)

OTHER PUBLICATIONS

Machine Translation of Chinese Patent Publication No. CN108598561 (Year: 2018).*
(Continued)

*Primary Examiner* — Wyatt P McConnell
(74) *Attorney, Agent, or Firm* — Osha Bergman Watanabe & Burton LLP

(57) ABSTRACT

The invention relates to a solid composite electrolyte comprising: i) at least one solid inorganic particle, ii) at least one ionic liquid electrolyte, and iii) at least one ionically non-conductive polymer, wherein the at least one solid inorganic particle i) is ionic conductive and is blended with the at least one ionic liquid electrolyte ii). The invention also relates to a process for manufacturing the solid composite electrolyte, to a solid state battery comprising the solid composite electrolyte, and to the use of said solid composite electrolyte in a solid state battery for improving ionic conductivity and mechanical properties.

14 Claims, 1 Drawing Sheet

(56) References Cited

U.S. PATENT DOCUMENTS

| | | | |
|---|---|---|---|
| 2016/0164137 A1 | 6/2016 | Moganty et al. | |
| 2017/0187063 A1 | 6/2017 | Pistorino et al. | |
| 2018/0040904 A1 | 2/2018 | Choi et al. | |

FOREIGN PATENT DOCUMENTS

| | | | |
|---|---|---|---|
| JP | 2009117168 A | 5/2009 | |
| JP | 2014203595 A | 10/2014 | |
| KR | 20180007556 A | 1/2018 | |
| WO | 15030407 A1 | 3/2015 | |

OTHER PUBLICATIONS

Chen L et al., PEO/Garnet Composite Electrolytes for Solid-State Lithium Batteries: from "Ceramic-in-Polymer" to "Polymer-in-Ceramic", Nano Energy, 2018, vol. 46, pp. 176-184.

Zhang W et al., "A Durable and Safe Solid-State Lithium Battery with a Hybrid Electrolyte", Nano Energy, 2018, vol. 45, pp. 413-419.

Yu J et. al., "A Ceramic-PVDF Composite Membrane and Modified Interfaces as an Ion-Conducting Electrolyte for Solid-State Lithium-Ion Batteries Operating at Room Temperature", CHEMELECTROCHEM, 2018, vol. 5, pp. 2873-2881.

Kim H W et al., "Hybrid solid electrolyte with the combination of $Li_7La_3Zr_2O_{12}$ ceramic and ionic liquid for high voltage pseudo-solid-state Li-ion batteries", Journal of Materials Chemistry A, Royal Society of Chemistry, 2016, vol. 4, pp. 17025-17032.

Sudo R et al., "Interface behavior between garnet-type lithium-conducting solid electrolyte and lithium metal", Solid State Ionics, 2014, vol. 262, pp. 151-154.

Tong X, "Highly Conductive Li Garnets by a Multielement Doping Strategy", Inorganic Chemistry, 2015, vol. 54, pp. 3600-3607.

Park J-Y et al., "Effect of solvated ionic liquids on the ion conducting property of composite membranes for lithium ion batteries", Research on Chemical Intermediates : Amsterdam, NL, 2018, vol. 44, No. 18, pp. 6039-6851.

Murugan R et al., "Fast Lithium Ion Conduction in Garnet-Type $Li_7La_3Zr_2O_{12}$", Angewandte Chemie Int. Ed., Communications, Lithium Batteries, 2007, vol. 46, pp. 7778-7781.

Jung Y-C et al., "Ceramic separators based on Li+ -conducting inorganic electrolyte for high-performance lithium-ion batteries with enhanced safety", Journal of Power Sources, 2015, vol. 293, pp. 675-683.

Fudong H et al., "Interphase Engineering Enabled All-Ceramic Lithium Battery", Joule, 2018, 2(3), pp. 497-508.

Zhaoshuai Z et al., "Interface-Engineered $Li_7La_3Zr_2O_{12}$ -Based Garnet Solid Electrolytes with Suppressed Li-Dendrite Formation and Enhanced Electrochemical Performance", CHEMSUSCHEM, 2018, vol. 11, No. 21, pp. 3774-3782.

* cited by examiner

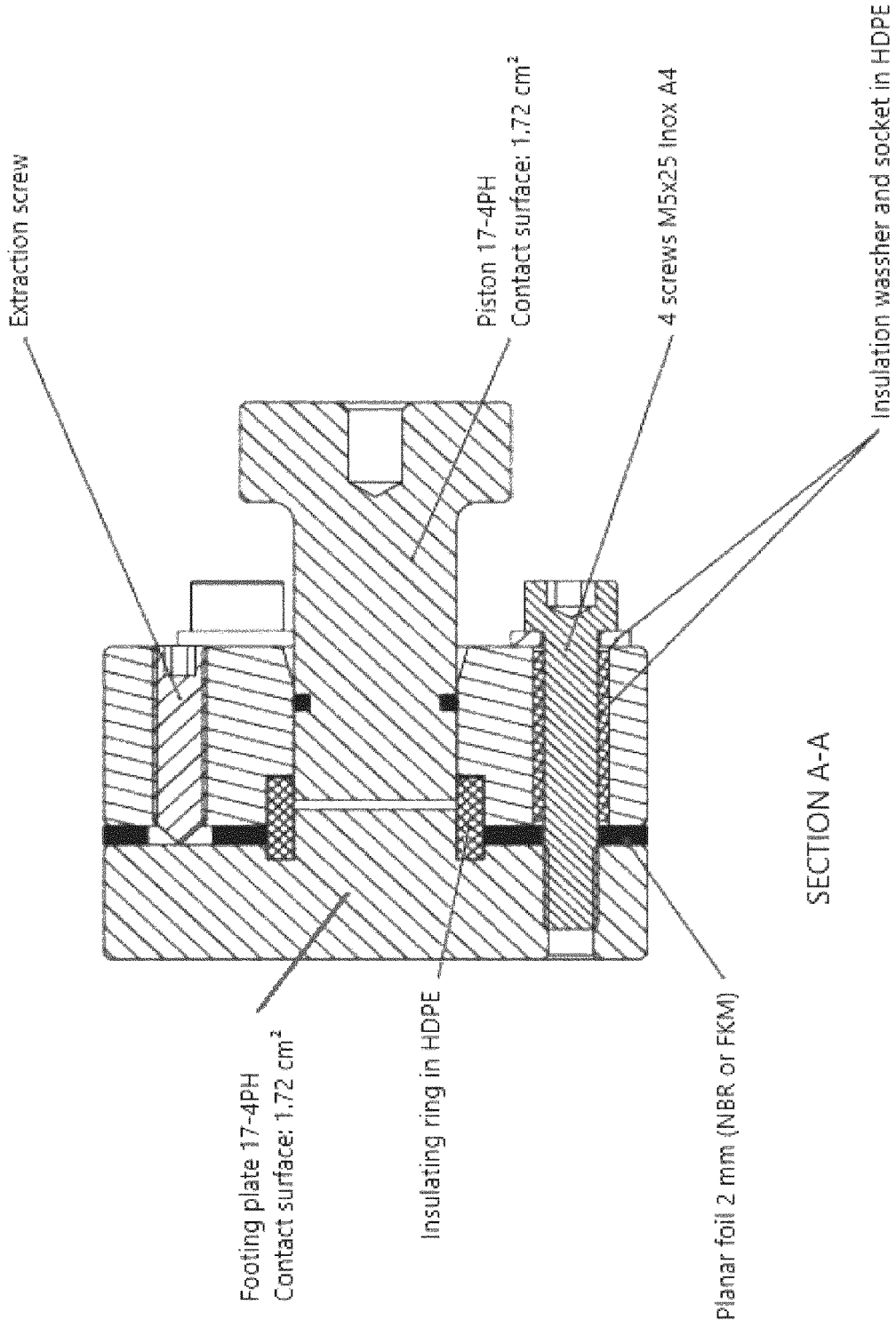

SOLID COMPOSITE ELECTROLYTE

CROSS-REFERENCE TO RELATED APPLICATION

The present application is a U.S. national stage entry under 35 U.S.C. § 371 of International Application No. PCT/EP2019/084682 filed Dec. 11, 2019, which claims priority to European application No. 18215742.0 filed on Dec. 21, 2018, the whole content of this application being incorporated herein by reference. Should the disclosure of any patents, patent applications, and publications which are incorporated herein by reference conflict with the description of the present application to the extent that it may render a term unclear, the present description shall take precedence.

TECHNICAL FIELD

The present invention relates to a solid composite electrolyte comprising i) at least one solid inorganic particle, ii) at least one ionic liquid electrolyte, and iii) at least one ionically non-conductive polymer, wherein the i) at least one solid inorganic particle is ionic conductive and is blended with the ii) at least one ionic liquid electrolyte.

TECHNICAL BACKGROUND

For more than two decades, Li-ion batteries have retained dominant position in the market of rechargeable energy storage devices due to their light weight, reasonable energy density and good cycle life. Nevertheless, current Li-ion batteries still suffer from poor safety and relatively low energy density with respect to the required energy density for high power applications such as electrical vehicles (EVs), hybrid electrical vehicles (HEVs) and grid energy storage. It is the presence of liquid electrolyte that is at the basis of these shortcomings.

In conventional Li-ion batteries, liquid electrolytes based on organic carbonates are used so that Li-ion batteries are prone to undergo leakage and generate volatile gaseous species, which are flammable.

Solid state batteries (SSB) are hence believed to be the next generation of energy storage devices, because they provide higher energy density and are safer than the conventional Li-ion batteries with liquid electrolyte system. In a SSB, the highly flammable liquid electrolyte is replaced by a solid electrolyte so that all risk of ignition and/or explosion is substantially removed.

There are three types of solid electrolytes: inorganic electrolyte, polymeric electrolyte and composite electrolyte. Inorganic electrolyte exhibits high ionic conductivity, but poor mechanical properties so that it's brittle. Ceramic inorganic electrolytes such as the garnet type Li-ionic conductive material suffer from poor grain boundary conductivity. These materials rely on sintering processes in order to fuse the grains and construct a conductive pathway. Only hot pressing has been successful in reducing the sintering duration, but it requires specialized and costly equipment, which is an obstacle for mass-production at commercial scales. Moreover, thin film formability by hot-pressing has not been demonstrated yet.

Dry polymer electrolyte shows good mechanical properties and processability, but suffers from low ionic conductivity. State of the art polymer conductor, for instance on poly(ethyleneoxide) having high molecular weight, where Li salts are dissolved, suffers from two main drawbacks. First, due to the crystallinity of the polymer, sufficient conductivity can only be obtained at temperatures beyond the melting temperatures so that their applicability is limited to high temperature applications only. Secondly, such a polymer electrolyte needs to be plasticized by the incorporation of salts, leading to very poor mechanical properties.

Composite electrolytes composed of solid inorganic ionic ($Li^+$) conducting particles (SIC particles), dispersed into a polymeric matrix, offer the possibility to combine high ionic conductivity with good mechanical properties. Despite the fact that composite electrolytes offer the possibility to solve the drawbacks of inorganic electrolytes and polymeric electrolytes, it has been found that it's far more complex than expected to manipulate/engineer the polymer and inorganic surface chemistry. It is well known that the major difficulty of solid (composite) electrolytes is the grain-to-grain contact resistance yielding low overall ionic conductivity of the solid electrolyte. This is especially the case for composite electrolytes that use garnet type ceramic electrolyte particles.

In most of the currently developed composite electrolytes, the addition of SIC particles into the polymeric electrolytes can improve the conductivity of the solid composite electrolyte. However, as Chen, L., et al. described in *Nano Energy*, 2018. 46: p.176-184 ("PEO garnet composite electrolytes for solid state lithium batteries"), the improved conductivity is due to the improvement of the ionic conductivity of the polymeric phase, rather than due to the exploitation of the conductivity of the SIC particles. Typically, improved ionic conductivity is only observed for composites with low loading of SIC particles. As soon as the SIC loading starts to increase, the overall conductivity is decreased, which is a clear evidence of the problematic grain-to-grain resistance.

Several attempts have been made to overcome the poor performance of composite electrolytes.

1. Addition of Liquid Electrolyte at the Interface Between Solid Electrolyte and Electrodes Both Zhang et al. in *Nano Energy*, 2018. 45: p. 413-419 ("A durable and safe solid-state lithium battery with a hybrid electrolyte") and Yu et al. in *Chemelectrochem*, 2018. 5: p. 2873-2881 ("A Ceramic-PVDF Composite Membrane with Modified Interfaces as an Ion-Conducting Electrolyte for Solid-State Lithium-Ion Batteries Operating at Room Temperature") have managed to increase the ionic conductivity of PVDF/LLZO composites by the addition/infiltration of liquid electrolytes at the interfaces between the solid composite electrolyte film and the electrodes (both sides). Although they have succeeded to improve the ionic conductivity of the composite electrolytes, the origin of conduction is mediated by the liquid electrolyte, which is absorbed into the polymer phase. It is well known that the conduction of ceramic-polymer composites with low ceramic loadings is mediated by the polymeric phase rather than the ceramic phase and that the addition of liquid electrolyte to solid polymer electrolytes leads to the formation of a gel-like structure in which the ionic conductivity is mediated by the liquid or gellified phase.

Moreover, the addition of conventional organic liquid electrolyte does not remove the risk of flammability in the battery assemblies.

2. Addition of Liquid Electrolyte in the Composite (Gel Composite Electrolyte)

A strategy that has been adopted to overcome the low conductivity of ceramic-polymer composite electrolyte is to incorporate a high amount of liquid electrolyte into the composite structure. As the porous polymeric separator is filled with liquid electrolyte, Jung et al. reported in *Journal of Power Sources*, 2015. 293: p. 675-683 ("Ceramic separators based on Lit conducting inorganic electrolyte for high-performance lithium-ion batteries with enhanced safety") that highly loaded ceramic separators composed of $Li_7La_3Zr_2O_{12}$ (LLZO) (from 80 to 90% by weight (wt %)) and PVDF-HFP were produced. In order to obtain certain ionic conductivity, these porous composites were filled with conventional liquid electrolyte (1.15 M of $LiPF_6$ in ethylene carbonate/diethyl carbonate). Although rather good ionic conductivity was obtained, however, it was clear that the ionic conductivity was obtained from the liquid or gellified phase. Moreover, like the previous strategy as detailed above, these hybrid structures yet contain a large amount of flammable organic liquid and hence the risk of flammability still remains in the battery assemblies.

3. Formation of Hybrid Between LLZO and Ionic Liquid (Electrolyte)

A hybrid electrolyte composed of LLZO particles (80 wt %) embedded in an ionic liquid based electrolyte (Pyr14TFSI+LiTFSI) (20 wt %) was developed by Kim et al. in *J. Mater. Chem. A*, 2016. 4: p. 17025-17032 ("Hybrid solid electrolyte with the combination of $Li_7La_3Zr_2O_{12}$ ceramic and ionic liquid for high voltage pseudo-solid state Li-ion batteries"). Although promising ionic conductivity of $4 \cdot 10^4$ S/cm has been obtained at room temperature, this hybrid electrolyte has very poor mechanical properties and hence cannot be used alone.

Some other attempts consist in preparing similar hybrid structurse of LLZO and Pyr14TFSI ionic liquid. However, these hybrid structures did not contain sufficient ionic liquid to bond the LLZO powders together. As a consequence, the hybrid structures had to be cold pressed to make pellets, which results in very poor mechanical properties.

The use of a solid electrolyte has been considered in place of a liquid electrolyte. For example, R. Sudo et al. describe in *Solid State Ionics*, 262, 151 (2014) the use of Al-doped $Li_7La_3Zr_2O_{12}$ as a solid electrolyte in a electrochemical cell comprising a lithium anode. However, another drawback of the formation of lithium dendrite was observed.

Therefore, there is still a need for a new solid electrolyte having high ionic conductivity, good mechanical properties, good processiblity and low grain-to-grain resistance, without using volatile and flammable oragnic liquid.

A solid electrolyte with improved ionic conductivity, improved grain-to-grain contact resistance, good mechanical properties which may be easily processed has been therefore sought and the developed solid composite electrolyte contains neither flammable nor volatile additives, removing the risk of fire and explosion. The developed solid composite electrolyte is composed of solid ionic conductive inorganic particles, which are blended with ionic liquid electrolyte. In order to reduce the grain-to-grain resistance between the solid ionic conductive inorganic particles, the solid inorganic particles need to be blended with an ionic liquid electrolyte so that at least part of the ionic liquid electrolyte covers at least part of the surface of the solid inorganic particles.

SUMMARY OF THE INVENTION

A first object of the present invention is a solid composite electrolyte comprising:
  i) at least one solid inorganic particle,
  ii) at least one ionic liquid electrolyte, and
  iii) at least one ionically non-conductive polymer,
    wherein the i) at least one solid inorganic particle is ionic conductive and is blended with the ii) at least one ionic liquid electrolyte.

According to one embodiment, the i) at least one solid inorganic particle is a garnet-type inorganic particle.

In one embodiment, an amount of the i) at least one solid inorganic particle is from 60.0 to 98.0 wt %, based on the total weight of the solid composite electrolyte. In a preferred embodiment, an amount of the i) at least one solid inorganic particle is from 70.0 to 95.0 wt %, based on the total weight of the solid composite electrolyte. In a more preferred embodiment, an amount of the i) at least one solid inorganic particle is from 80.0 to 92.0 wt %, based on the total weight of the solid composite electrolyte.

A second object of the present invention is a process for manufacturing the solid composite electrolyte as described above.

A third object of the present invention is a solid state battery comprising the solid composite electrolyte as described above.

A fourth object of the present invention is the use of the solid composite electrolyte as described above in a solid state battery for improving ionic conductivity and mechanical properties.

Surprisingly, it has been found by the present inventors that the solid composite electrolyte comprising i) at least one solid inorganic particle, ii) at least one ionic liquid electrolyte and iii) at least one ionically non-conductive polymer, wherein the i) at least one solid inorganic particle is ionic conductive and is blended with the ii) at least one ionic liquid electrolyte, delivers a particularly advantageous combination of properties, e.g., ionic conductivity and mechanical properties. It is believed that the blending of the i) at least one solid inorganic particle with the ii) at least one ionic liquid electrolyte, effectively decrease the grain-to-grain resistance of the solid composite electrolyte. More surprisingly, such solid composite electrolyte was obtained without using an ionically conductive binder.

BRIEF DESCRIPTION OF DRAWINGS

FIG. 1 is a cross-section of the pressure cell in AC impedance spectroscopy, developed within Solvay to measure the ionic conductivity of the film. In the pressure cell, the film is pressed between 2 stainless steel electrodes during impedance measurement.

DETAILED DESCRIPTION OF THE INVENTION

The following constituents of the solid composite electrolyte according to the invention are described hereafter in details. It is to be understood that both the foregoing general description and the following detailed description are exemplary and are intended to provide further explanation of the invention as claimed. Accordingly, various changes and modifications, described herein will be apparent to those of ordinary skill in the art. Moreover, descriptions of well-known functions and constructions may be omitted for clarity and conciseness.

In the present invention, the term "solid composite electrolyte" refers to a composite material having lithium ionic conductivity which has a freestanding shape at room temperature without a support, and may be in the form of a foldable, flexible and self-standing film The solid composite electrolyte according to the present invention does neither flow to take on the shape of its container, nor does it expand to fill the entire volume available. On the other hand, the solid composite electrolyte according to the present invention may be shaped in a variety of manner due to its flexivility and hence may accommodate a change in either volume or shape which may happen during charging and discharging of a lithium battery.

Solid Inorganic Particle

The solid composite electrolyte according to the invention comprises i) at least one solid inorganic particle. According to a first embodiment of the invention, said i) at least one solid inorganic particle is a garnet-type inorganic particle. According to a second embodiment of the invention, the said i) at least one solid inorganic particle is an oxide inorganic particle which is not a garnet-type. According to a third embodiement of the invention, the said i) at least one solid inorganic particle is a phosphate inorganic particle.

The term "garnet" as used herein refers to the atomic structure of crystalline or partially crystalline oxide ceramic solid.

In one embodiment, the garnet-type inorganic particle has a general formula of $M^1_a M^2_b M^3_c O_d$, wherein
  $M^1$ is a first cationic element selected from the group consisting of H, Li, Na, Mg, Al and Ga, preferably Li;
  $M^2$ is a second cationic element selected from the group consisting of La, Ba, Sr, Ca, In, Mg, Y, Sc, Cr, Al, K, Ce, Pr, Nd, Pm, Sm, Eu, Gd, Tb, Dy, Ho, Er, Tm, Yb and Lu;
  $M^3$ is a third cationic element selected from the group consisting of Zr, Ta, Nb, Sb, Sn, Hf, Bi, W, Si, Se, Ga and Ge; and
  a, b, c, and d are positive numbers including various combinations of integers and decimals.

In a preferred embodiment, the i) at least one solid inorganic particle has a general formula of $Li_x La_y Zr_z A_w O_{12}$, wherein:
  A represents one or several dopants selected from the group consisting of Al, Ga, Nb, Fe, Nd, Pt, Ta, W, Mo, Hf, Si, Ca, Sr, Ba, Ge, and mixtures thereof; preferably from the group consisting of Al, Ga, Nb, Fe, Nd, Pt, Ta, W, and mixtures thereof; more preferably from the group consisting of Al, Ga, W, and mixtures thereof;
  w, x, y, and z are positive numbers, including various combinations of integers and fractions or decimals;
  $0 < y \leq 3$; preferably $2 \leq y \leq 3$; preferably $2.5 \leq y \leq 3$;
  $0 < z \leq 2$; preferably $1 \leq z \leq 2$; preferably $1.5 \leq z \leq 2$;
  $0 \leq w \leq 0.5$; preferably $0 \leq w \leq 0.35$; more preferably $0 \leq w \leq 0.25$; and
  x is derived from electroneutrality of the garnet structure.

In a preferred embodiment, the i) at least one solid inorganic particle is LLZO. The term "LLZO" as used herein refers to the general formula of $Li_x L_{3y} Zr_z A_w O_{12}$, with x, y, x, w, and A as described above. According to a preferred embodiment, the i) at least one solid inorganic particle is LLZO doped with Al, W, Ga or combinations thereof.

The general formulas given in the present application correspond to the stoichiometry of the crystalline structure given by x-ray diffraction (XRD).

LLZO can be prepared according to standard procedure known from state of the art, for instance in *Inorg. Chem.*, 2015, 54, 3600-3607, and in *Angew. Chem. Int. Ed.* 2007, 46, 7778-7781. For instance, LLZO can typically be prepared by solid-state reaction that is well described in the litterature. Precursors such as oxides, carbonates, hydroxides, oxyhydroxides or nitrates can be used. Stoichiometric amount of precursors are dried and mixed by ball-milling. To compensate for volatile lithium loss during calcination, a slight excess of Li (usually 10-30% mol) can be added to the starting materials. Successive calcinations are run at temperatures higher than 900° C. with intermediate ball-milling in between each calcination step to get LLZO. Standard calcination successive steps are, for instance, 12 hours at 900° C. and 12 hours at 1100° C.

According to one embodiment, an amount of the i) at least one solid inorganic particle is from 60.0 to 98.0 wt %, preferably from 70.0 to 95.0 wt %, and more preferably from 80.0 to 92.0 wt %, based on the total weight of the solid composite electrolyte.

Ionic Liquid

The term "ionic liquid" as used herein refers to a compound comprising a positively charged cation and a negatively charged anion, which is in the liquid state at temperature of 100° C. or less under atmospheric pressure. While ordinary liquids such as water are predominantly made of electrically neutral molecules, ionic liquids are largely made of ions and short-lived ion pairs. As used herein, the term "ionic liquid" indicates a compound free from solvent.

The term "cationic atom" as used herein refers to at least one non-metal atom which carries the positive charge.

The term "onium cation" as used herein refers to a positively charged ion having at least part of its charge localized on at least one non-metal atom such as O, N, S, or P.

In the present invention, the ionic liquid has a general formula of $A^{n-} Q^{1+}_{(n/l)}$, wherein
  $A^{n-}$ represents an anion;
  $Q^{1+}_{(n/l)}$ represents a cation;
  n and l, independently selected between 1 and 5, represent respectively the charges of the anion $A^{n-}$ and of the cation $Q^{1+}_{(n/l)}$.

The cation(s) may be selected, independently of one another, from metal cations and organic cations. The cation(s) may be monocharged cations or polycharged cations.

As metal cation, mention may preferably be made of alkali metal cations, alkaline-earth metal cations and cations of d-block elements.

In the present invention, $Q^{1+}_{(n/l)}$ may represent an onium cation. Onium cations are cations formed by the elements of Groups VB and VIB (as defined by the old European IUPAC system according to the Periodic Table of the Elements) with three or four hydrocarbon chains. The Group VB comprises the N, P, As, Sb and Bi atoms. The Group VIB comprises the O, S, Se, Te and Po atoms. The onium cation can in particular be a cation formed by an atom selected from the group consisting of N, P, O and S, more preferably N and P, with three or four hydrocarbon chains.

The onium cation $Q^{1+}_{(n/l)}$ can be selected from:
  heterocyclic onium cations; in particular those selected from the group consisting of:

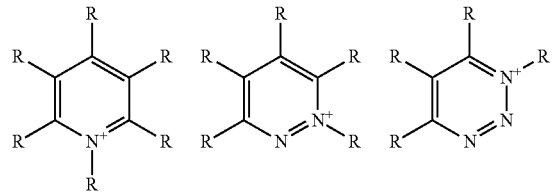

-continued

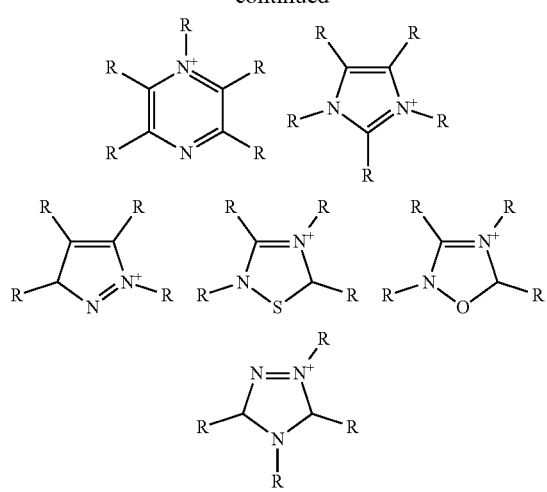

unsaturated cyclic onium cations; in particular those selected from the group consisting of:

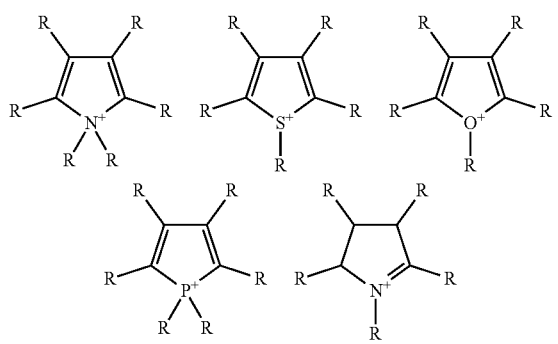

saturated cyclic onium cations; in particular those selected from the group consisting of:

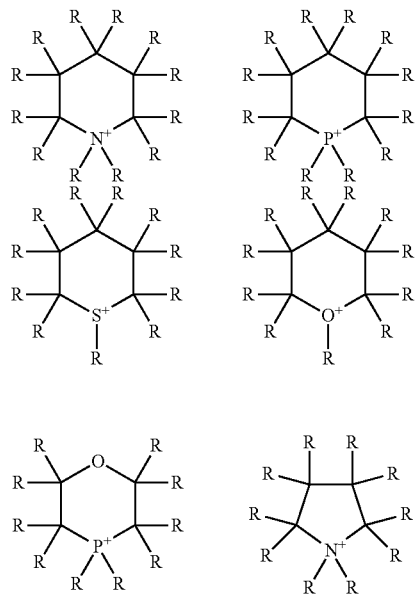

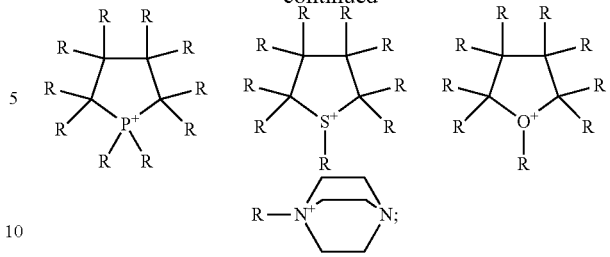

and non-cyclic onium cations; in particular those of general formula $^{+}L\text{-}R'_s$, in which L represents an atom selected from the group consisting of N, P, O and S, more preferably N and P, s represents the number of R' groups selected from 2, 3 or 4 according to the valency of the element L, each R' independently represents a hydrogen atom or a $C_1$ to $C_8$ alkyl group, and the bond between $L^+$ and R' can be a single bond or a double bond.

In the above formulas, each "R" symbol represents, independently of one another, a hydrogen atom or an organic group. Preferably, each "R" symbol can represent, in the above formulas, independently of one another, a hydrogen atom or a saturated or unsaturated and linear, branched or cyclic $C_1$ to $C_{18}$ hydrocarbon group optionally substituted one or more times by a halogen atom, an amino group, an imino group, an amide group, an ether group, an ester group, a hydroxyl group, a carboxyl group, a carbamoyl group, a cyano group, a sulfone group or a sulfite group.

The cation $Q^{1+}_{(n/I)}$ can more particularly be selected from ammonium, phosphonium, pyridinium, pyrrolidinium, pyrazolinium, imidazolium, arsenium, quaternary ammonium and quaternary phosphonium cations.

The quaternary ammonium or quaternary phosphonium cations can more preferably be selected from tetraalkylammonium or tetraalkylphosphonium cations, trialkylbenzylammonium or trialkylbenzylphosphonium cations or tetraarylammonium or tetraarylphosphonium cations, the alkyl groups of which, either identical or different, represents a linear or branched alkyl chain having from 4 to 12 carbon atoms, preferably from 4 to 6 carbon atoms, and the aryl groups of which, either identical or different, represents a phenyl or naphthyl group.

In a specific embodiment, $Q^{1+}_{(n/I)}$ represents a quaternary phosphonium or quaternary ammonium cation.

In one preferred embodiment, $Q^{1+}_{(n/I)}$ represents a quaternary phosphonium cation. Non-limiting examples of the quaternary phosphonium cation comprise trihexyl(tetradecyl)phosphonium, and a tetraalkylphosphonium cation, particularly the tetrabutylphosphonium ($PBu_4$) cation.

In another embodiment, $Q^{1+}_{(n/I)}$ represents an imidazolium cation. Non-limiting examples of the imidazolium cation comprise 1,3-dimethylimidazolium, 1-(4-sulfobutyl)-3-methyl imidazolium, 1-allyl-3H-imidazolium, 1-butyl-3-methylimidazolium, 1-ethyl-3-methylimidazolium, 1-hexyl-3-methylimidazolium, 1-octyl-3-methylimidazolium In another embodiment, $Q^{1+}_{(n/I)}$ represents a quaternary ammonium cation which is selected in particular from the group consisting of tetraethylammonium, tetrapropylammonium, tetrabutylammonium, trimethylbenzylammonium, methyltributylammonium, N,N-diethyl-N-methyl-N-(2-methoxyethyl) ammonium, N,N-dimethyl-N-ethyl-N-(3-methoxypropyl) ammonium, N,N-dimethyl-N-ethyl-N-benzyl ammonium, N,N-dimethyl-N-ethyl-N-phenylethyl ammonium, N-tributyl-N-methyl ammonium, N-trimethyl-N-butyl ammonium, N-trimethyl-N-hexyl ammonium, N-trimethyl-N-propyl ammonium, and Aliquat 336 (mixture of methyltri($C_8$ to $C_{10}$ alkyl)ammonium compounds).

In one embodiment, $Q^{1+}_{(n/l)}$ represents a piperidinium cation, in particular N-butyl-N-methyl piperidinium, N-propyl-N-methyl piperidinium.

In another embodiment, $Q^{1+}_{(n/l)}$ represents a pyridinium cation, in particular N-methylpyridinium.

In a more preferred embodiment, $Q^{1+}_{(n/l)}$ represents a pyrrolidinium cation. Among specific pyrrolidinium cations, mention may be made of the following: $C_{1-12}$alkyl-$C_{1-12}$alkyl-pyrrolidinium, and more preferably $C_{1-4}$alkyl-$C_{1-4}$alkyl-pyrrolidinium. Examples of pyrrolidinium cations comprise, but not limited to, N,N-dimethylpyrrolidinium, N-ethyl-N-methylpyrrolidinium, N-isopropyl-N-methylpyrrolidinium, N-methyl-N-propylpyrrolidinium, N-butyl-N-methylpyrrolidinium, N-octyl-N-methylpyrrolidinium, N-benzyl-N-methylpyrrolinium, N-cyclohexylmethyl-N-methylpyrrolidinium, N-[(2-hydroxy)ethyl]-N-methylpyrrolidinium. More preferred are N-methyl-N-propylpyrrolidinium (PYR13) and N-butyl-N-methylpyrrolidinium (PYR14).

Non-limiting examples of an anion of the ionic liquid comprise iodide, bromide, chloride, hydrogen sulfate, dicyanamide, acetate, diethyl phosphate, methyl phosphonate, fluorinated anion, e.g., hexafluorophosphate ($PF_6^-$) and tetrafluoroborate ($BF_4^-$), and oxaloborate of the following formula:

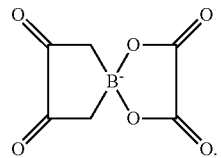 [SMILES: O=C1C[B-]2(CC1=O)OC(=O)C(=O)O2]

In one embodiment, $A^{n-}$ is a fluorinated anion. Among the fluorinated anions that can be used in the present invention, fluorinated sulfonimide anions may be particularly advantageous. The organic anion may in particular be selected from the anions having the following general formula:

$(Ea-SO_2)N^-R$ in which:
Ea represents a fluorine atom or a group having preferably from 1 to 10 carbon atoms, selected from fluoroalkyls, perfluoroalkyls and fluoroalkenyls, and
R represents a substituent.

Preferably, Ea may represent F or $CF_3$.

According to a first embodiment, R represents a hydrogen atom.

According to a second embodiment, R represents a linear or branched, cyclic or non-cyclic hydrocarbon-based group, preferably having from 1 to 10 carbon atoms, which can optionally bear one or more unsaturations, and which is optionally substituted one or more times with a halogen atom, a nitrile function, or an alkyl group optionally substituted one of several time by a halogen atom. Moreover, R may represent a nitrile group —CN.

According to a third embodiment, R represents a sulfinate group. In particular, R may represent the group —$SO_2$-Ea, Ea being as defined above. In this case, the fluorinated anion may be symmetrical, i.e. such that the two Ea groups of the anion are identical, or non-symmetrical, i.e. such that the two Ea groups of the anion are different.

Moreover, R may represent the group —$SO_2$—R', R' representing a linear or branched, cyclic or non-cyclic hydrocarbon-based group, preferably having from 1 to 10 carbon atoms, which can optionally bear one or more unsaturations, and which is optionally substituted one or more times with a halogen atom, a nitrile function, or an alkyl group optionally substituted one of several time by a halogen atom. In particular, R' may comprise a vinyl or allyl group. Furthermore, R may represent the group —$SO_2$—N—R', R' being as defined above or else R' represents a sulfonate function —$SO_3$—.

Cyclic hydrocarbon-based group may preferably refer to a cycloalkyl group or to an aryl group. "Cycloalkyl" refers to a monocyclic hydrocarbon chain, having 3 to 8 carbon atoms. Preferred examples of cycloalkyl groups are cyclopentyl and cyclohexyl. "Aryl" refers to a monocyclic or polycyclic aromatic hydrocarbon group, having 6 to 20 carbon atoms. Preferred examples of aryl groups are phenyl and naphthyl. When the group is a polycyclic group, the rings may be condensed or attached by σ (sigma) bonds.

According to a fourth embodiment, R represents a carbonyl group. R may in particular be represented by the formula —CO—R', R' being as defined above.

The organic anion that can be used in the present invention may advantageously be selected from the group consisting of $CF_3SO_2N^-SO_2CF_3$ (bis(trifluoromethane sulfonyl)imide anion, commonly denoted as TFSI), $FSO_2N^-SO_2F$ (bis(fluorosulfonyl)imide anion, commonly denoted as FSI), $CF_3SO_2N^-SO_2F$, and $CF_3SO_2N^-SO_2N^-SO_2CF_3$.

In a preferred embobiment, the ionic liquid contains:
a positively charged cation selected from the group consisting of imidazolium, pyridinium, pyrrolidinium and piperidinium ions optionally containing one or more $C_1$-$C_{30}$ alkyl groups, and
a negatively charged anion selected from the group consisting of halides, fluorinated anions and borates.

Non-limiting examples of $C_1$-$C_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In the present invention, ii) at least one ionic liquid electrolyte comprises at least one ionic liquid and at least one lithium salt.

In the present invention, when the i) at least one solid inorganic particle is blended with the ii) at least one ionic liquid electrolyte, at least part of ii) the ionic liquid electrolye covers at least a part of the surface of i) the solid inorganic particles.

Lithium Salt

The lithium salt is described as a lithium ion complex such as lithium hexafluorophosphate ($LiPF_6$), lithium perchlorate ($LiClO_4$), lithium hexafluoroarsenate ($LiAsF_6$), lithium hexafluoroantimonate ($LiSbF_6$), lithium hexafluorotantalate ($LiTaF_6$), lithium tetrachloroaluminate ($LiAlCl_4$), lithium tetrafluoroborate ($LiBF_4$), lithium chloroborate ($Li_2B_{10}Cl_{10}$), lithium fluoroborate ($Li_2B_{10}F_{10}$), $Li_2B_{12}F_xH_{12-x}$ wherein x=0-12; $LiPF_x(R_F)_{6-x}$ and $LiBF_y(R_F)_{4-y}$ wherein $R_F$ represents perfluorinated $C_1$-$C_{20}$ alkyl groups or perfluorinated aromatic groups, x=0-5 and y=0-3, $LiBF_2[O_2C(CX_2)_nCO_2]$, $LiPF_2[O_2C(CX_2)_nCO_2]_2$, $LiPF_4[O_2C(CX_2)_nCO_2]$ wherein X is selected from the group consisting of H, F, Cl, $C_1$-$C_4$ alkyl groups and fluorinated alkyl groups, and n=0-4, lithium trifluoromethane sulfonate (LiCF$_3$SO$_3$), lithium bis(fluorosulfonyl)imide Li(FSO$_2$)$_2$N (LiFSI), LiN(SO$_2$C$_m$F$_{2m+1}$)(SO$_2$C$_n$F$_{2n+1}$) and LiC(SO$_2$C$_k$F$_{2k+1}$)(SO$_2$C$_m$F$_{2m+1}$)(SO$_2$C$_n$F$_{2n+1}$) wherein k=1-10, m=1-10 and n=1-10, LiN(SO$_2$C$_p$F$_{2p}$SO$_2$) and LiC(SO$_2$C$_p$F$_{2p}$SO$_2$)(SO$_2$C$_q$F$_{2q+1}$) wherein p=1-10 and q=1-10, lithium salts of chelated orthoborates and chelated orthophosphates such as lithium bis(oxalato)borate [LiB(C$_2$O$_4$)$_2$], lithium bis(malonato)borate [LiB(O$_2$CCH$_2$CO$_2$)$_2$], lithium bis(difluoromalonato) borate [LiB(O$_2$CCF$_2$CO$_2$)$_2$], lithium (malonatooxalato) borate [LiB(C$_2$O$_4$)(O$_2$CCH$_2$CO$_2$)], lithium (difluoromalonatooxalato) borate [LiB(C$_2$O$_4$)(O$_2$CCF$_2$CO$_2$)], lithium tris(oxalato) phosphate [LiP(C$_2$O$_4$)$_3$], lithium tris(difluoromalonato) phosphate [LiP(O$_2$CCF$_2$CO$_2$)$_3$], lithium difluorophosphate (LiPO$_2$F$_2$), lithium 2-trifluoromethyl-4,5-dicyanoimidazole (LiTDI), and mixtures of the foregoing.

The preferred lithium salts are lithium hexafluorophosphate (LiPF$_6$), lithium bis(fluorosulfonyl)imide Li(FSO$_2$)$_2$N (LiFSI), lithium 2-trifluoromethyl-4,5-dicyanoimidazole (LiTDI), LiBF$_4$, LiB(C$_2$O$_4$)$_2$, LiAsF$_6$, LiClO$_4$, LiNO$_3$, lithium bis(osalato)borate, LiCF$_3$SO$_3$, LiN(SO$_2$CF$_3$)$_2$ (LiTFSI), LiN(SO$_2$C$_2$F$_5$)$_2$, LiC(SO$_2$CF$_3$)$_3$, LiN(SO$_3$CF$_3$)$_2$, LiC$_4$F$_9$SO$_3$, LiCF$_{93}$SO$_3$, LiAlCl$_4$, LiSbF$_6$, LiF, LiBr, LiCl, LiOH, LiPFSi, and lithium trifluoromethanesulfonate The more preferred lithium salts are lithium hexafluorophosphate (LiPF$_6$), lithium bis(fluorosulfonyl)imide LiN(SO$_2$CF$_3$)$_2$ (LiTFSI), and lithium bis(fluorosulfonyl)imide Li(FSO$_2$)$_2$N (LiFSI), which may be used alone or in combination.

The concentration of the lithium salt(s) generally ranges from 0.1 to 3.0 mol per liter, preferably from 0.15 to 2.0 mol per liter, and more preferably from 0.2 to 1.0 mol per liter of the ionic liquid electrolyte.

According to one embodiment, an amount of the ii) at least one ionic liquid electrolyte is from 1.0 to 30.0 wt %, preferably from 3.0 to 25.0 wt %, more preferably from 5 to 20 wt % and even more preferably from 5 to 15 wt % based on the total weight of the solid composite electrolyte.

Ionically Non-Conductive Polymer

A binder is responsible for holding the active materials within the electrode of a lithium ion battery. Such binder materials are usually inert and have an important role in the manufacturing of the battery. Ideal binder materials are expected to form a good network between the active materials and the conductive additives which are stable and facilitate the electronic and inonic transport.

A large number of binder materials are known in the art, among which fluoropolymers are known in the art to be suitable for the manufacture of different components for use in electrochemical devices such as lithium-ion batteries. In particular, vinylidene fluoride (VDF) (co)polymers have been found to have a good electrochemical stability and high adhesion to the electrode materials and to current collectors.

In the present invention, the polymer is ionically non-conductive.

Non-limitative examples of the ionically non-conductive polymer include, notably, VDF (co)polymers, styrene-butadiene rubber (SBR), styrene-ethylene-buthylene-styrene (SEBS), carboxymethylcellulose (CMC), polyamideimide (PAI), perfluoroalkoxy alkane (PFA), and poly(tetrafluoroethylene) (PTFE) and poly(acrylonitrile) (PAN) (co)polymers.

VDF (Co)Polymer

Polyvinylidenefluoride (PVDF or VDF polymer) is one of the most widely used fluoropolymers in battery components, due to its high anodic and cathodic stability, binding strength and adhesion with current collectors.

In one embodiment, the ionically non-conductive polymer according to the present invention is VDF (co)polymer. In the present invention, the VDF polymer refers to a polymer essentially made of the recurring units, more than 85% by moles of said recurring units being derived from VDF.

The VDF polymer is preferably a polymer comprising
(a) at least 85% by moles of the recurring units derived from VDF;
(b) optionally from 0.1 to 15%, preferably from 0.1 to 12%, more preferably from 0.1 to 10% by moles of the recurring units derived from a fluorinated monomer different from VDF; and
(c) optionally from 0.1 to 5%, by moles, preferably 0.1 to 3% by moles, more preferably 0.1 to 1% by moles of the recurring units derived from one or more hydrogenated comonomers,
wherein all the aforementioned % by moles is referred to the total moles of recurring units of the VDF polymer.

Non-limiting examples of suitable fluorinated monomer different from VDF include, notably, the followings:
C$_2$-C$_8$ perfluoroolefins, such as tetrafluoroethylene and hexafluoropropylene (HFP);
C$_2$-C$_8$ hydrogenated fluoroolefins, such as vinyl fluoride, 1,2-difluoroethylene and trifluoroethylene;
perfluoroalkylethylenes of formula CH$_2$=CH—R$_{f0}$, wherein R$_{f0}$ is a C$_1$-C$_6$ perfluoroalkyl;
chloro- and/or bromo- and/or iodo-C$_2$-C$_6$ fluoroolefins such as chlorotrifluoroethylene;
(per)fluoroalkylvinylethers of formula CF$_2$=CFOR$_{f1}$, wherein R$_{f1}$ is a C$_1$-C$_6$ fluoro- or perfluoroalkyl, e.g. CF$_3$, C$_2$F$_5$, C$_3$F$_7$;
CF$_2$=CFOX$_0$ (per)fluoro-oxyalkylvinylethers wherein X$_0$ is a C$_1$-C$_{12}$ alkyl group, a C$_1$-C$_{12}$ oxyalkyl group or a C$_1$-C$_{12}$ (per)fluorooxyalkyl group having one or more ether groups, such as perfluoro-2-propoxy-propyl group;
(per)fluoroalkylvinylethers of formula CF$_2$=CFOCF$_2$OR$_{f2}$, wherein R$_{f2}$ is a C$_1$-C$_6$ fluoro- or perfluoroalkyl group, e.g. CF$_3$, C$_2$F$_5$, C$_3$F$_7$ or a C$_1$-C$_6$ (per)fluorooxyalkyl group having one or more ether groups such as —C$_2$F$_5$—O—CF$_3$;
functional (per)fluoro-oxyalkylvinylethers of formula CF$_2$=CFOY$_0$, wherein Y$_0$ is a C$_1$-C$_{12}$ alkyl group or (per)fluoroalkyl group, a C$_1$-C$_{12}$ oxyalkyl group or a C$_1$-C$_{12}$ (per)fluorooxyalkyl group having one or more ether groups and Y$_0$ comprising a carboxylic or sulfonic acid group, in its acid, acid halide or salt form; and
fluorodioxoles, preferably perfluorodioxoles.

In a preferred embodiment, said (b) fluorinated monomer is advantageously selected from the group consisting of vinyl fluoride, trifluoroethylene, chlorotrifluoroethylene (CTFE), 1,2-difluoroethylene, tetrafluoroethylene (TFE), hexafluoropropylene (HFP), perfluoro(alkyl)vinyl ethers, such as perfluoro(methyl)vinyl ether (PMVE), perfluoro(ethyl) vinyl ether (PEVE) and perfluoro(propyl)vinyl ether (PPVE), perfluoro(1,3-dioxole), perfluoro(2,2-dimethyl-1,3-dioxole) (PDD). Preferably, the possible additional fluorinated monomer is selected from the group consisting of chlorotrifluoroethylene (CTFE), hexafluoproylene (HFP), trifluoroethylene (TrFE) and tetrafluoroethylene (TFE).

In order to further improve the performance, various copolymers of VDF have been studied and as non-limitative examples of the VDF (co)polymers useful in the present invention, mention can be notably made of homopolymers of VDF, VDF/TFE copolymers, VDF/TFE/HFP copolymers, VDF/TFE/CTFE copolymers, VDF/TFE/TrFE copolymers, VDF/CTFE copolymers, VDF/HFP copolymers, VDF/TFE/HFP/CTFE copolymers, and the like.

Said hydrogenated comonomer is not particularly limited; alpha-olefins, (meth)acrylic monomers, vinyl ether monomers, and styrenic mononomers may be used. Nevertheless, in one embodiment, for the sake of optimizing chemical resistance, the VDF polymer essentially free from recurring units derived from said hydrogenated comonomer is preferred.

Accordingly, the VDF polymer is more preferably a polymer consisting essentially of:
(a) at least 85% by moles of recurring units derived from VDF;
(b) optionally from 0.1 to 15%, preferably from 0.1 to 12%, more preferably from 0.1 to 10% by moles of a fluorinated monomer different from VDF; said fluorinated monomer being preferably selected in the group consisting of vinylfluoride, chlorotrifluoroethylene (CTFE), hexafluoropropene (HFP), tetrafluoroethylene (TFE), perfluoromethylvinylether (MVE), trifluoroethylene (TrFE) and mixtures therefrom,
wherein all the aforementioned % by moles is referred to the total moles of recurring units of the VDF polymer.

Defects, end chains, impurities, chains inversions or branchings and the like may be additionally present in the VDF polymer in addition to the said recurring units, without these components substantially modifying the behaviour and properties of the VDF polymer.

In one embodiment according to the present invention, the VDF homopolymers are particularly advantageous for being used as the ionically non-conductive polymer in the soild composite electrolyte.

In another particular embodiment according to the present invention, the copolymer of VDF comprises recurring units derived from VDF monomer and at least one hydrophilic (meth)acrylic monomer of the following formula:

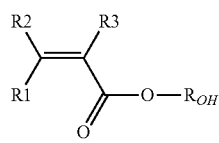

wherein each of R1, R2, R3, equal or different from each other, is independently a hydrogen atom or a $C_1$-$C_3$ hydrocarbon group, and ROH is a hydrogen or a $C_1$-$C_5$ hydrocarbon moiety comprising at least one hydroxyl group, said copolymer of VDF comprising from 0.05 to 10% by moles of the recurring units derived from said hydrophilic (meth) acrylic monomer (MA) and being characterized by a fraction of randomly distributed units (MA) of at least 40%.

Non limitative examples of hydrophilic (meth)acrylic monomers (MA) are notably acrylic acid, methacrylic acid, hydroxyethyl (meth)acrylate, hydroxypropyl(meth)acrylate; hydroxyethylhexyl(meth)acrylates.

The monomer (MA) is more preferably selected from the group consisting of:
hydroxyethylacrylate (HEA) of the following formula:

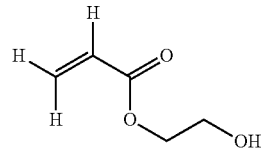

2-hydroxypropyl acrylate (HPA) of either of the following formula:

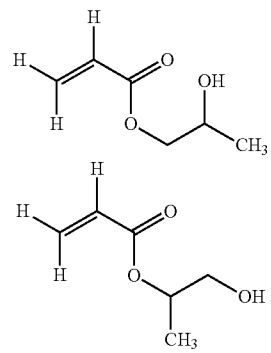

acrylic acid (AA) of the following formula:

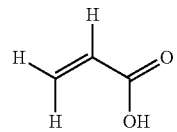

and
mixtures thereof
Most preferably, the monomer is AA and/or HEA.
In a preferred embodiment, the ionically non-conductive polymer is VDF/AA copolymer.

Styrenic Block Copolymer

In one embodiment, the ionically non-conductive polymer according to the present invention is styrenic block copolymer consisting of polystyrene blocks and rubber blocks. The rubber blocks essentially consist of polybutadiene, polyisoprene or hydrogenated equivalents thereof. Non-limitative examples of the styrenic block copolymer comprise SBR (styrene butadiene rubber) and its selectively hydrogenated rubber, that is SEBS (styrene-ethylene-butylene-styrene). SBR also includes high styrene rubber, which has high compositional proportion of styrene and a high glass transition temperature (Tg). Further, in the present invention, SBR includes a modified SBR, which is copolymerized with an unsaturated carboxylic acid or an unsaturated nitrile compound. These types of SBR slightly differ from one another in physical properties (e.g., adhesion property, strength and thermal property), which difference is attributed to the copolymerization type and the styrene/butadiene copolymerization ratio.

In one embodiment, the ionically non-conductive polymer according to the present invention is SEBS (styrene-ethylene-butylene-styrene).

CMC

In one embodiment, the ionically non-conductive polymer according to the present invention is a cellulose-based materials comprising, but not limited to, caboxymethyl cellulose (CMC), diacetyl cellulose, hydroxypropyl cellulos, and methylhydroxypropyl cellulose. In a preferred embodiment, the ionically non-conductive polymer according to the present invention is CMC.

PAI

In one embodiment, the ionically non-conductive polymer according to the present invention is polyamideimide (PAI). PAI is either thermosetting or thermoplastic, amorphous polymer which has exceptional mechanical, thermal and chemical resistant properties. PAI exhibits a combination of properties from both polyamide and polyimide, such as high strength, melt processibility, exceptional high heat capability and broad chemical resistance.

In the present invention, PAI comprises recurring units, more than 50% mol of said recurring units comprising at least one aromatic ring and at least one amic acid group and/or imide group, more than 50% mol of said recurring units comprising at least one amic acid group, wherein part or all of the amic acid groups are neutralized by at least one basic compound.

The recurring units are advantageously selectred from:

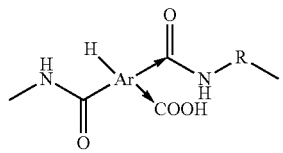

(A)

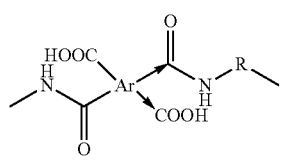

(B)

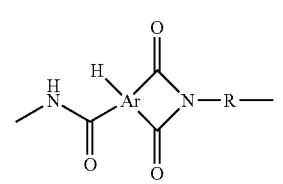

(C)

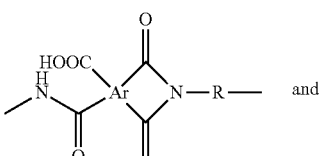

(D)

and

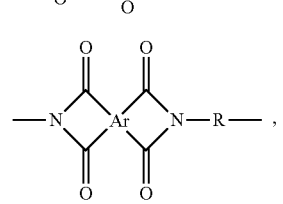

(E)

wherein
the notation of "→" refers to isomerism that in any recurring unit within the aromatic polyamic acid structure the groups to which the arrows point may exist as shown or in an interchanged position;
"Ar" refers to an aromatic tetravalent group, which may comprise one or more aromatic ring and is preferably selected from the group consisting of:

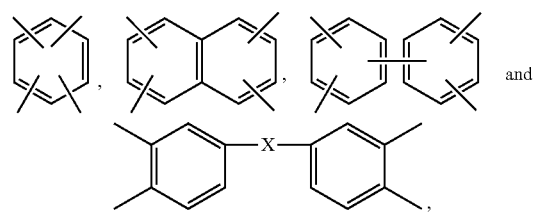

and wherein X is selected from the group consisting of —O—, —C(O)—, —S—, —SO$_2$—, —CH$_2$—, —C(CF$_3$)$_2$—, —(CF$_2$)n— with n=0, 1, 2, 3, 4 or 5;
R is an aromatic divalent group, which may comprise one or more aromatic ring and is selected from the group consisting of:

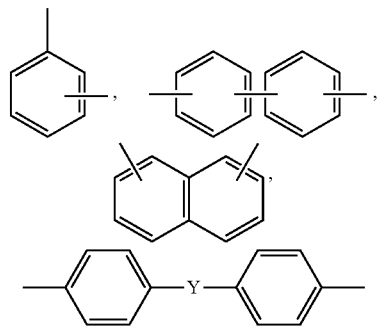

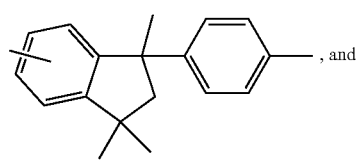

wherein Y is selected from the group consisting of —O—, —C(O)—, —S—, —SO$_2$—, —CH$_2$—, —C(CF$_3$)$_2$—, —(CF$_2$)n— with n=0, 1, 2, 3, 4 or 5,

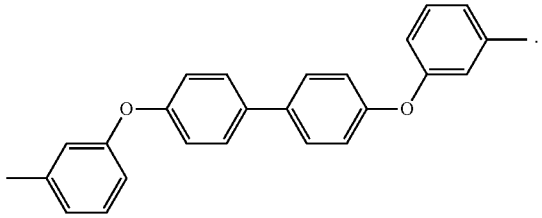

, and

Suitable basic compounds are notably those who can neutralize the amic groups of the recurring units of PAI. Inorganic and organic bases can be used for neutralizing part or all of the amic acid groups in PAI.

Non limitative examples of inorganic bases are notably alkaline and alkaline-earth metal hydroxides, such as NaOH, KOH, Mg(OH)$_2$, ammonia, and the like.

Non limitative examples of organic bases are notably organic amines, such as aliphatic, aromatic, heterocyclic or heteroaromatic amines.

Preferably, the basic compound is a tertiary amine. The tertiary amine may be notably a tri-($C_1$-$C_4$ alkyl)amine, such as trimethylamine, N,N-dimethylethylamine, N,N-dimethylpropylamine, triethylamine, tributylamine, etc. Cyclic tertiary amines may also be found useful. Tertiary alkanol amines, such as N,N-dimethylethanolamine, N-butyldiethanolamine diethyl-2-hydroxyethylamine, etc. may also be used. Aromatic amines, such as N,N-dimethylaniline, pyridine, N-methylpyrrole, etc. can also be employed. Although polyfunctional amines such as N,N'-dimethylpiperidine, as well as N,N,N'N'-tetraalkyl-alkaline diamines and poly-N-alkylated alkalene triamines may be found effectiveas well, the polyfunctional amines may tend to form associative crosslinks and gel, and hence be less preferred.

Most preferred basic compound is chosen from the group consisting of N,N-dimethylethanolamine, N-butyldiethanolamine, diethyl-2-hydroxyethylamine and mixtures thereof.

PFA

In one embodiment, the ionically non-conductive polymer according to the present invention is a perfluoroalkoxy alkane (PFA). PFA is a copolymer of tetrafluoroethylene and perfluoroether, wherein said perfluoroether has the formula of $C_2F_3OR_f$, where $R_f$ is a perfluorinated group such as trifluoromethyl ($CF_3$). In such a specific embodiment, PFA has the following formula:

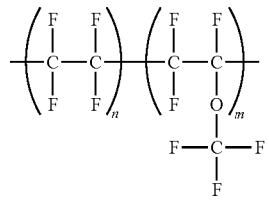

PTFE

In one embodiment, the ionically non-conductive polymer according to the present invention is a tetrafluoroethylene (TFE) polymer or TFE copolymer with one or more perfluorinated comonomers.

Among suitable comonomers, mention can be made of:
- $C_3$-$C_8$ perfluoroolefin, e.g. hexafluoropropene (HFP) and hexafluoroiso-butene;
- $CF_2$=$CFOR_f$ perfluoroalkylvinylether (PAVE), wherein $R_f$ is a $C_1$-$C_6$ perfluoroalkyl, e.g., —$CF_3$, —$C_2F_5$, or —$C_3F_7$,
- $CF_2$=CFOX perfluorooxyalkylvinylether, wherein X is a $C_1$-$C_{12}$ perfluorooxyalkyl having one or more ether groups; and
- perfluorodioxoles.

Preferably, said comonomer is selected from the following comonomers:
- PAVE of formula $CF_2$=$CFOR_{f1}$, wherein $R_{f1}$ is selected from —$CF_3$, —$C_2F_5$, and —$C_3F_7$, namely, perfluoromethylvinylether (PMVE of formula $CF_2$=$CFOCF_3$), perfluoroethylvinylether (PEVE of formula $CF_2$=$CFOC_2F_5$), perfluoropropylvinylether (PPVE of formula $CF_2$=$CFOC_3F_7$), and mixtures thereof;
- perfluoromethoxy vinyl ether (MOVE) of general formula $CF_2$=CFOC—$F_2OR_{f2}$, wherein $R_{f2}$ is a linear or branched $C_1$-$C_6$ perfluoroalkyl group, cyclic $C_5$-$C_6$ perfluoroalkyl group, a linear or branched $C_2$-$C_6$ perfluoroxyalkyl group; preferably, $R_{f2}$ is —$CF_2CF_3$ (MOVE1), —$CF_2CF_2OCF_3$ (MOVE2), or —$CF_3$ (MOVE3); and
- perfluorodioxoles having the following formula:

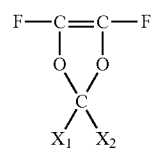

wherein $X_1$ and $X_2$, equal to or different from each other, are selected between F and $CF_3$, preferably F.

Non-limiting examples of perfluorodioxole as a suitable perfluorinated comonomer comprise

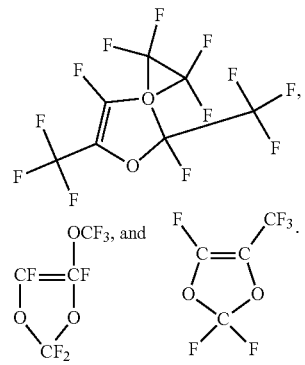

In terms of properties, PFA and PTFE are similar fluoropolymers. The big difference therebetween is that the alkoxy substituent in PFA allows the polymer to be melt-processed. On a molecular level, PFA has a smaller chain length and higher chain entanglement than other fluoropolymers. It also contains an oxygen atom at the branches, which results in the properties of being more translucent and improvement in flow and thermal stability, close to or even exceeding PTFE.

PAN

In one embodiment, the ionically non-conductive polymer according to the present invention is a PAN (polyacrylonitrile). Most of PAN polymers are copolymers made from mixutres of monomers with acrylonitrile as the main monomer. Non limitative examples of PAN copolymers comprise styrene-acrylonitrile (SAN) copolymer, poly(acrylonitrile-co-methyl acrylate) (PAN-MA) and acrylonitrile butadiene styrene (ABS) copolymer.

PAO

In one embodiment, the ionically non-conductive polymer according to the present invention is PAO (polyalkylene oxide) polymer or copolymer. PAO is represented by the general formula H—(O—R)n—OH wherein R represents an alkylene group preferably having 1 to 20, more preferably 2 to 12 carbon atoms. The best known polyalkylene oxide is polyethylene oxide (PEO), also commonly refered to as polyethylene glycol (PEG), which is the preferred polyalkylene oxide for the method of the present invention.

In the present invention, additives may be additionally present in the solid composite electrolyte. Examples of other additives include, but not limited to, cathode protection agents, $LiPF_6$ salt stabilizer, safety protection agent, dispersant, Li deposition improver, ionic salvation enhancer, Al corrosion inhibitor, wetting agent, viscosity diluter, anti-swelling agents, low temperature or high temperature performance enhancers.According to one embodiment, an amount of the iii) at least one ionically non-conductive polymer is from 1.0 to 10.0 wt %, and preferably from 2.0 to 5.0 wt %, and more preferably from 3.0 to 5.0 wt %, based on the total weight of the solid composite electrolyte.

According to one embodiment, the solid composite electrolyte comprises:
  from 60.0 to 98.0 wt % of i) at least one solid inorganic particle;
  from 1.0 to 30.0 wt % of ii) at least one ionic liquid electrolyte; and
  from 1.0 to 10.0 wt % of iii) at least one ionically non-conductive polymer, based on the total weight of the solid composite electrolyte.

According to one preferred embodiment, the solid composite electrolyte comprises:
  from 75.0 to 95.0 wt % of i) at least one solid inorganic particle;
  from 3.0 to 20.0 wt % of ii) at least one ionic liquid electrolyte; and
  from 2.0 to 5.0 wt % of iii) at least one ionically non-conductive polymer, based on the total weight of the solid composite electrolyte.

According to another preferred embodiment, the solid composite electrolyte comprises:
  from 80.0 to 92.0 wt % of i) at least one solid inorganic particle;
  from 5.0 to 20.0 wt % of ii) at least one ionic liquid electrolyte; and
  from 3.0 to 5.0 wt % of iii) at least one ionically non-conductive polymer, based on the total weight of the solid composite electrolyte.

A second object of the invention is a process for manufacturing the solid composite electrolyte as detailed above.

In one embodiment, the process according to the invention comprises the steps of
  blending i) at least one solid inorganic particle with ii) at least one ionic liquid electrolyte;
  preparing a polymer solution of iii) at least one ionically non-conductive polymer;
  mixing said blended solid inorganic particles with the polymer solution;
  casting the resulting solid composite electrolyte on a substrate to form a wet film;
  drying the wet film; and
  calendaring the film.

In another embodiment, the process according to the invention comprises the steps of
  blending i) at least one solid inorganic particle with ii) at least one ionic liquid electrolyte;
  mixing said blended solid inorganic particles with iii) at least one ionically non-conductive polymer to obtain a viscous paste; and
  calendaring or extruding the viscous paste in successive steps to obtain a solid uniform film,
  wherein the iii) at least one ionically non-conductive polymer is in dry state.

In another embodiment the process according to the invention comprises the steps of
  blending i) at least one solid inorganic particle with ii) at least one ionic liquid electrolyte;
  mixing said blended solid inorganic particles with iii) at least one ionically non-conductive polymer to obtain a dry powder;
  powder coating said dry powder; and
  annealing the deposited powder to obtain a film.

A third object of the present invention is a solid state battery comprising the solid composite electrolyte as described above. The solid composite electrolyte according to the present invention may be used to prepare an electrode, an interlayer or a separator in a solid state battery.

A fourth object of the present invention is the use of the solid composite electrolye as described above, for improving ionic conductivity and mechanical properties.

Mechanical property may be assessed with the naked eyes in a manner whether a film is i) self-standing without any support, ii) flexible, meaning it can be repeatebly bended without breaking or crack formation and iii) mechanical resistant to deformation. It means that it should be able to resist the physical stress of a pressing/calendaring step during which the porosity of the film is reduced and that it should be compatible with a roll-to-roll or stacking process.

Should the disclosure of any patents, patent applications, and publications that are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXAMPLES

Raw Materials

Solid inorganic particles: W-doped LLZO with the nominal composition of $Li_{6.3}La_3Zr_{1.65}W_{0.35}O_{12}$. W-doped LLZO particles were obtained in accordance with the procedure disclosed in *Inorg. Chem.*, 2015, 54, 3600-3607.

Ionic liquid electrolyte (ILE): LiTFSI/PYR14TFSI, available from Solvay.

Ionically non-conductive polymer:
  Solef®5130 (PVDF-AA copolymer, available from Solvay Specialty Polymers Italy S.p.A): Ex. 1, Ex. 2, Ex. 4, Ex. 5, Ex. 6, Ex. 7, and Comp. Ex 1;
  Solef®21216 (PVDF-HFP copolymer, also available from Solvay Specialty Polymers Italy S.p.A): Ex. 3.
  Tuftec™N504 (Styrene-Ethylene-Butylene-Styrene copolymer; available from Asahi Kasei): Ex. 8

Preparative Examples

Example 1 (Ex. 1)

An ionic liquid electrolyte was prepared in the following manner. Lithium bis(trifluoromethanesulfonyl)imide (LiTFSI) was dissolved at a concentration of 5 wt % in 1-butyl-1-methylpyrrolidinium bis(trifluoromethanesulfonyl)imide (PYR14TFSI) to make the ionic liquid electroylte. Same ionic liquid electrolyte was used in the following examples.

LLZO was then blended with an ionic liquid containing a Li salt. Lithium bis(trifluoromethanesulfonyl)imide (LiTFSI) was dissolved into the 1-butyl-1-methylpyrrolidinium bis(trifluoromethanesulfonyl)imide (PYR14TFSI) at a concentration of 5 wt % of LiTFSI. Subsequently, 4.6 g of W-doped LLZO was mixed together with 0.25 g of ionic liquid electrolyte in a planetary mixer (speedmixer DAC 400.1 FVZ; 2 min@2000 rpm). The blended LLZO powders were mixed in a PVDF solution (Solef®5130; 5 wt % in NMP), cast on a polymeric substrate with a motorized film applicator and dried at 80° C. under vacuum. The obtained free-standing film was finally calendared at 80° C. using a Precision 4" Hot Rolling Press/Calender (MSK-HRP-01, supplied by MTI corporation). The films were calendared until no change in thickness could be obtained.

Examples 2-8 (Ex. 2-8)

Ex. 2, and Ex. 4-7 were prepared in the same manner as Ex. 1, respectively, except that the amount of ionic liquid electrolyte was different.

Ex. 3 was prepared in the same manner as Ex. 1, except that the amount of ionic liquid electrolyte was different and PVDF-HFP copolymer was used instead of PVDF-AA copolymer.

Ex. 8 was also prepared in the same manner as Ex. 1, except that that the amount of ionic liquid electrolyte was different and a styrene-ethylene-butylene-styrene was used instead of PVDF-AA copolymer.

Comparative Example 1 (Comp. Ex. 1)

6 g of W-doped LLZO (same as used in Example 1) was mixed with 0.15 g of an additive, 3 ml of DMF and 3 mm zirconia beads in 3-dimensional shaker/mixer (Turbula T2F) for 16 hours. The homogenized product was then mixed with a PVDF-LiTFSI solution (0.3 g of PVDF-AA copolymer, 0.12 g of LiTFSI and 9 g of DMF), cast on ECTFE (ethylene chlorotrifluoroethylene) substrate and dried under vacuum at 80° C. As such, a highly loaded ceramic film was obtained with 93.6 wt % of LLZO (including 2.3 wt % of another additive), which was dispersed in 4.5 wt % of PVDF with 1.9 wt % of LiTFSI as Li salt. Finally, the obtained self-standing film was calendared at 80° C.

Comparative Example 2

5 g of W-doped LLZO (same as used in Example 1) was mixed together with 1 g of the ionic liquid electrolyte in a planetary mixer (speedmixer DAC 400.1 FVZ; 2 min@2000 rpm) so as to obtain a viscous paste. Although this paste could be modeled or pressed into a simple shape (such as a disc), it didn't have self-standing properties at all. Therefore, the composition according to Comp. Ex. 2 is not practically useable as a solid composite electrolyte.

All the compositions of the resulting composite film of Ex. 1-4 and Comp. Ex. 1-2 are indicated in the below Table 1.

TABLE 1

|  | LLZO | ILE | Polymer | Li salt | Additive |
| --- | --- | --- | --- | --- | --- |
| Ex. 1 | 91.9 | 5.1 | 3.0 | — | — |
| Ex. 2 | 91.2 | 6.7 | 2.0 | — | — |
| Ex. 3 | 89.6 | 7.4 | 3.0 | — | — |
| Ex. 4 | 88.0 | 10.0 | 2.0 | — | — |
| Ex. 5 | 86.8 | 10.0 | 3.1 | — | — |
| Ex. 6 | 82.1 | 14.9 | 3.0 | — | — |
| Ex. 7 | 78.0 | 17.0 | 5.0 | — | — |
| Ex. 8 | 85.6 | 11.3 | 3.1 | — | — |

TABLE 1-continued

|  | LLZO | ILE | Polymer | Li salt | Additive |
| --- | --- | --- | --- | --- | --- |
| Comp. Ex. 1 | 91.3 | — | 4.5 | 1.9 (LiTFSI) | 2.3 |
| Comp. Ex. 2 | 83.3 | 16.7 | — | — | — |

Measurement of Ionic Conductivity

The ionic conductivity of the films were measured by AC impedance spectroscopy with an in-house developed pressure cell, where the film is pressed (55 MPa) between two stainless steel electrodes during impedance measurements. A cross section of the pressure cell is shown in FIG. 1.

The resistance R of the solid composite electrolyte film was obtained by extrapolating (with a linear model) the quasi-linear part of the low frequency diffusion tail of the impedance spectra. The Resistance R was measured at 20° C. and was taken where the extrapolated curve crosses the X axis. Accordingly, the ionic conductivity σ was obtained using the equation of $\sigma = d/(R \times A)$, wherein d is the thickness of the film and A is the area of the stainless steel electrode.

The SI unit of ionic conductivity is siemens per meter (S/m), wherein S is ohm-1. The results are indicated in Table 2.

TABLE 2

|  | at 20° C. | |
| --- | --- | --- |
|  | R | σ (S/cm) |
| Ex. 1 | 290 | 2.83E−05 |
| Ex. 2 | 171 | 7.60E−05 |
| Ex. 3 | 124 | 5.93E−05 |
| Ex. 4 | 66 | 1.37E−04 |
| Ex. 5 | 94 | 9.93E−05 |
| Ex. 6 | 43 | 1.84E−04 |
| Ex. 7 | 63 | 1.09E−04 |
| Ex. 8 | 100 | 9.89E−05 |
| Comp. Ex. 1 | 5704 | 7.94E−07 |
| Comp. Ex. 2 | 69 | 6.6E−04 |

As shown in the Table 2 as above, the films obtained according to the present invention (Ex. 1-8) exhibited much better ionic conductivity than the film from Comp. Ex. 1. In this regards, even though the hybrid formulation from Comp. Ex. 2 showed good ionic conductivity due to the presence of the ionic liquid electrolyte in rather high amount, said composition didn't have the self-standing property, whereas all the films from Ex. 1-8 exhibited good mechanical properties, which were apparently demonstrated by the self-standing features without requiring any support and also showed good flexibility.

The invention claimed is:
1. A solid composite electrolyte comprising:
   i) at least one solid inorganic particle,
   ii) at least one ionic liquid electrolyte, and
   iii) at least one ionically non-conductive polymer,
      wherein the at least one solid inorganic particle i) is ionic conductive and is blended with the at least one ionic liquid electrolyte ii) such that at least part of the at least one ionic liquid electrolyte covers at least part of the surface of the at least one solid inorganic particle, reducing grain-to-grain resistance between the at least one solid inorganic particle;

wherein an amount of the at least one solid inorganic particle i) is from 60.0 to 98.0% by weight (wt %), based on the total weight of the solid composite electrolyte; and wherein the ionic liquid electrolyte comprises:
- a positively charged cation selected from the group consisting of imidazolium, pyridinium, pyrrolidinium and piperidinium ions optionally containing one or more $C_1$-$C_{30}$ alkyl groups, and
- a negatively charged anion selected from the group consisting of halides, fluorinated anions and borates,
wherein $C_1$-$C_{30}$ alkyl groups include methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pently, 2-methyl-2-hexyl, octyl, 4-methyl-3-heptyl, nonyl, decyl, undecyl, and dodecyl groups.

2. The solid composite electrolyte according to claim 1, wherein the at least one solid inorganic particle i) is a garnet-type inorganic particle having a general formula of $M^1_a M^2_b M^3_c O_d$, wherein
- $M^1$ is a first cationic element selected from the group consisting of H, Li, Na, Mg, Al and Ga;
- $M^2$ is a second cationic element selected from the group consisting of La, Ba, Sr, Ca, In, Mg, Y, Sc, Cr, Al, K, Ce, Pr, Nd, Pm, Sm, Eu, Gd, Tb, Dy, Ho, Er, Tm, Yb and Lu;
- $M^3$ is a third cationic element selected from the group consisting of Zr, Ta, Nb, Sb, Sn, Hf, Bi, W, Si, Se, Ga, and Ge; and
- a, b, c and d are positive numbers including various combinations of integers and decimals.

3. The solid composite electrolyte according to claim 1, wherein the at least one solid inorganic particle i) is a garnet-type inorganic particle having a general formula of $Li_x La_y Zr_z A_w O_{12}$, wherein:
- A represents one or several dopants selected from the group consisting of Al, Ga, Nb, Fe, Nd, Pt, Ta, W, Mo, Hf, Si, Ca, Sr, Ba, Ge, and mixtures thereof;
- w, x, y, and z are positive numbers, including various combinations of integers, zero and fractions or decimals;
- $0 < y \leq 3$;
- $0 < z \leq 2$;
- $0 \leq w \leq 0.5$; and
- x is derived from electroneutrality of the garnet structure.

4. The solid composite electrolyte according to claim 3, wherein A represents one or several dopants selected from the group consisting of Al, W, Ga or combinations thereof.

5. The solid composite electrolyte according to claim 1, wherein the at least one ionic liquid electrolyte ii) comprises at least one ionic liquid and at least one Li salt.

6. The solid composite electrolyte according to claim 5, wherein the lithium salt comprises at least one selected from the group consisting of lithium hexafluorophosphate ($LiPF_6$), lithium bis(fluorosulfonyl)imide Li $(FSO_2)_2N$ (LiFSI), lithium 2-trifluoromethyl-4,5-dicyanoimidazole (LiTDI), $LiBF_4$, LiB $(C_2O_4)_2$, $LiAsF_6$, $LiClO_4$, $LiNO_3$, lithium bis(osalato) borate, $LiCF_3SO_3$, LiN $(SO_2CF_3)_2$ (LiTFSI), LiN $(SO_2C_2F_5)_2$, $LiC(SO_2CF_3)_3$, LiN $(SO_3CF_3)_2$, $LiC_4F_9SO_3$, $LiCF_{93}SO_3$, $LiAlCl_4$, $LiSbF_6$, LiF, LiBr, LiCl, LiOH, LiPFSi, and lithium trifluoromethanesulfonate.

7. The solid composite electrolyte according to claim 1, wherein the at least one ionically non-conductive polymer iii) comprises a polymer selected from the group consisting of vinylidene fluoride (VDF) (co) polymers, styrene-butadiene rubber (SBR), styrene-ethylene-butylene-styrene (SEBS), carboxymethylcellulose (CMC), polyamideimide (PAI), perfluoroalkoxy alkane (PFA), poly(tetrafluoroethylene) (PTFE), poly(acrylonitrile) (PAN) (co) polymers, and polyalkylene oxide (PAO) (co) polymers.

8. The solid composite electrolyte according to claim 1, wherein an amount of the at least one ionic liquid electrolyte ii) is from 1.0 to 30.0 wt %, based on the total weight of the solid composite electrolyte.

9. The solid composite electrolyte according to claim 1, wherein an amount of the at least one ionically non-conductive polymer iii) is from 1.0 to 10.0 wt %, based on the total weight of the solid composite electrolyte.

10. A process for manufacturing the solid composite electrolyte according to claim 1, comprising the steps of
- blending the at least one solid inorganic particle i) with the at least one ionic liquid electrolyte ii);
- preparing a polymer solution of the at least one ionically non-conductive polymer iii);
- mixing said blended solid inorganic particles with the polymer solution;
- casting the resulting solid composite electrolyte on a substrate to form a wet film;
- drying the wet film; and
- calendaring the film.

11. A process for manufacturing the solid composite electrolyte according to claim 1, comprising the steps of
- blending the at least one solid inorganic particle i) with the at least one ionic liquid electrolyte ii);
- mixing said blended solid inorganic particles with the at least one ionically non-conductive polymer iii) to obtain a viscous paste; and
- calendaring or extruding the viscous paste in successive steps to obtain a solid uniform film,
wherein the at least one ionically non-conductive polymer iii) is in dry state.

12. A solid state battery comprising the solid composite electrolyte according to claim 1.

13. The solid composite electrolyte of claim 1, wherein the solid composite electrolyte has an ionic conductivity of at least $1 \times 10^{-5}$ S/cm and the solid composite electrolyte is self-standing and flexible.

14. The solid composite electrolyte according to claim 3, wherein in the general formula of $Li_x La_y Zr_z A_w O_{12}$, A represents one or several dopants selected from the group consisting of Al, Ga, Nb, Fe, Nd, Pt, Ta, W, and mixtures thereof.

* * * * *